(12) United States Patent
Thomson et al.

(10) Patent No.: US 9,137,663 B2
(45) Date of Patent: Sep. 15, 2015

(54) RADIO FREQUENCY FIREWALL COORDINATION

(75) Inventors: Allan Thomson, Pleasanton, CA (US); Brian Donald Hart, Sunnyvale, CA (US); Mark Paul Yankowski, Pleasanton, CA (US); Christine Andiazabal, Emerald Hills, CA (US); Timothy S. Olson, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1378 days.

(21) Appl. No.: 11/555,883

(22) Filed: Nov. 2, 2006

(65) Prior Publication Data

US 2008/0107090 A1 May 8, 2008

(51) Int. Cl.
| | |
|---|---|
| H04M 3/16 | (2006.01) |
| H04W 12/08 | (2009.01) |
| H04L 29/06 | (2006.01) |
| H04W 4/02 | (2009.01) |

(52) U.S. Cl.
CPC ............. H04W 12/08 (2013.01); H04L 63/107 (2013.01); *H04W 4/02* (2013.01); *H04W 4/023* (2013.01)

(58) Field of Classification Search
USPC .......... 370/338; 455/411, 41.2, 404.2, 412.2, 455/456.1–456.3; 726/26
See application file for complete search history.

(56) References Cited

U.S. PATENT DOCUMENTS

| | | | |
|---|---|---|---|
| 6,505,045 B1 | 1/2003 | Hills | |
| 6,636,737 B1 | 10/2003 | Hills | |
| 6,804,783 B1 | 10/2004 | Wesinger | |
| 7,308,703 B2* | 12/2007 | Wright et al. | 726/1 |
| 7,339,892 B1* | 3/2008 | Engwer et al. | 370/235 |
| 2002/0155852 A1* | 10/2002 | Bender | 455/522 |
| 2003/0219008 A1* | 11/2003 | Hrastar | 370/352 |
| 2004/0162995 A1* | 8/2004 | Muaddi et al. | 713/201 |
| 2005/0073979 A1* | 4/2005 | Barber et al. | 370/338 |
| 2005/0181779 A1* | 8/2005 | Jones et al. | 455/456.3 |

(Continued)

FOREIGN PATENT DOCUMENTS

| | | |
|---|---|---|
| CN | 1414742 A | 4/2003 |
| WO | WO 2005/057884 | 6/2005 |

OTHER PUBLICATIONS

Henderson, Tom, "Newbury Network's WiFi Watchdog", Network World Lab Alliance, Network World, Mar. 15, 2004.

(Continued)

*Primary Examiner* — Christopher M Brandt
*Assistant Examiner* — Joseph Dean, Jr.
(74) *Attorney, Agent, or Firm* — Baker Botts L.L.P.

(57) ABSTRACT

In one embodiment, a method includes identifying, responsive to a triggering event, one or more radio frequency (RF) firewall transceivers that neighbor a data wireless access point to which a given wireless client is communicating; configuring one or more of the identified neighboring RF firewall transceivers to detect RF frames transmitted by the wireless client; causing the data wireless access point to transmit one or more wireless messages operative to cause the wireless client to transmit RF frames; collecting RF signal data corresponding to the RF frames transduced by one or more of the identified neighboring RF firewall transceivers; transmitting the collected RF signal data to a location system; receiving from the location system an indication of the location of the wireless client; and applying one or more network access policies based on the indication of the location.

27 Claims, 9 Drawing Sheets

(56) References Cited

U.S. PATENT DOCUMENTS

2006/0195899 A1* 8/2006 Ben-Shachar et al. .......... 726/12
2006/0239198 A1* 10/2006 Mlinarsky et al. ............ 370/241

OTHER PUBLICATIONS

CN First Office Action (with English translation) from Chinese Patent Application No. 200780033934.3, mailed Jul. 14, 2010.
CN Second Office Action (with English translation) from Chinese Patent Application No. 200780033934.3, mailed Apr. 25, 2011.
CN Third Office Action (with English translation) from Chinese Patent Application No. 200780033934.3, mailed Mar. 12, 2012.
International Preliminary Report on Patentability from International Application No. PCT/US2007/083340, mailed May 5, 2009.
International Search Report from International Application No. PCT/US2007/083340, mailed Jun. 13, 2008.
Written Opinion from International Application No. PCT/US2007/083340, mailed Jun. 13, 2008.

* cited by examiner

RADIO FREQUENCY FIREWALL COORDINATION

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Due to the propagation of radio frequency (RF) energy during communications in a wireless network, the wireless network within a building may be detected strongly enough outside of the building to allow network access. For security reasons, there is a need to prevent unauthorized access to the wireless network.

DESCRIPTION OF EXAMPLE EMBODIMENTS

A. Overview

Particular embodiments of the present invention provide radio frequency (RF) firewall coordination functionality for managing access to a wireless network. An RF firewall is a protective barrier, outside of which wireless clients can be denied access to the wireless network. An RF firewall perimeter may coincide with a perimeter of a building, for example. In one implementation, the perimeter may be a predefined area that is defined by a network administrator at a WLAN management server and then subsequently pushed to a location server for RF firewall coordination functionality. In one particular implementation, the RF firewall coordination functionality, in response to a triggering event such as an attempt by a wireless client to connect to a given data wireless access point of the wireless network, identifies RF firewall wireless access points that neighbor the data wireless access point with which a given wireless client is communicating. As described in more detail below, an RF firewall wireless access point may be any wireless access point having RF firewall functionality. For example, in one implementation, the RF firewall coordination functionality configures the RF firewall wireless access points to detect RF frames transmitted by the wireless client and commands the data wireless access point to transmit one or more messages operative to cause the wireless client to transmit RF frames, which enables the RF firewall access points to detect and measure the frame signal strength. The RF firewall coordination functionality then collects RF signal data corresponding to the RF frames, detected by one or more of the RF firewall wireless access points, and transmits the RF signal data to a location server, which determines whether the wireless client is inside or outside a predefined area (e.g., the perimeter of a building). In one implementation, upon receiving an inside/outside determination from the location server, the RF firewall coordination functionality applies one or more network access policies to grant or deny access to the wireless network based on whether the wireless client is either inside or outside the building. Particular implementations achieve an RF firewall that yields a rapid in/out determination, allowing one or more access policies to be applied quickly and thereby improve the end-user experience.

B. Example Wireless Network System Architecture

B.1. Network Topology

Figure 1A:
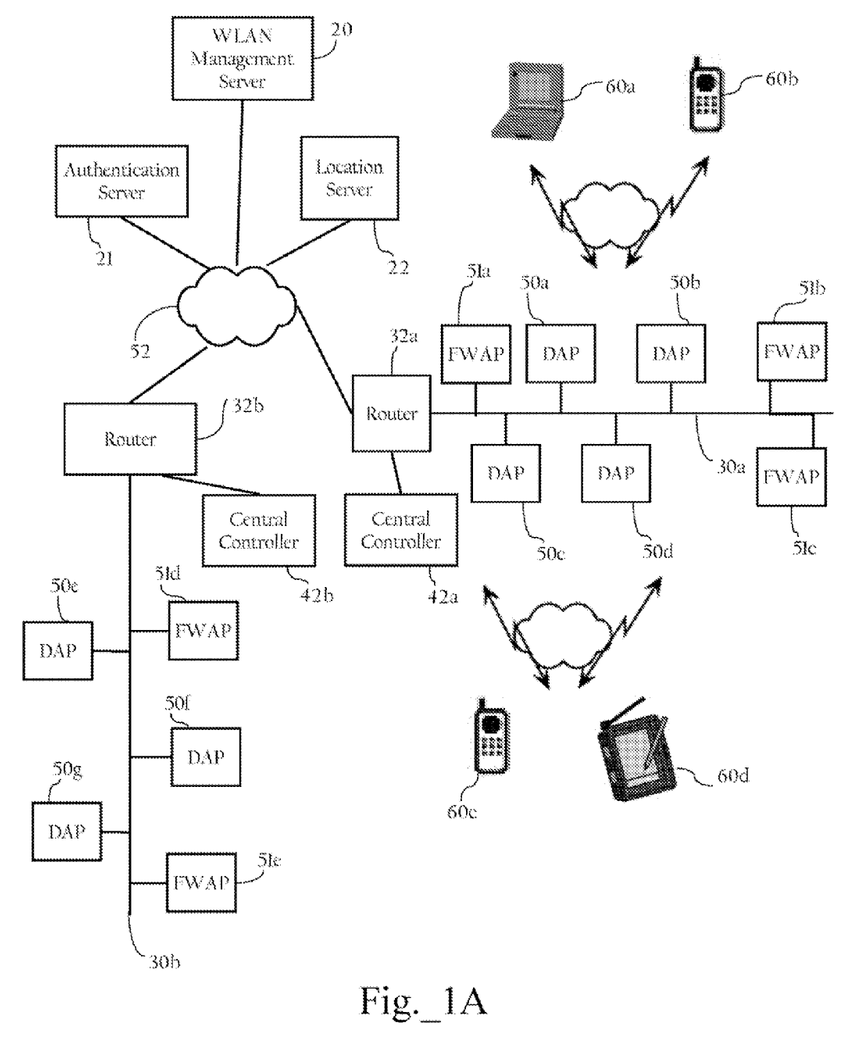
FIG. 1A illustrates example components in a wireless local area network (WLAN) system.

FIG. 1A illustrates example components in a wireless local area network (WLAN) system. In a specific embodiment of the present invention, the system includes a WLAN management server 20, an Authentication Authorization and Account (AAA) server 21, a location server 22, central controllers 42a and 42b, local area networks (LANs) 30a and 30b, routers 32a and 32b, data wireless access points 50a, 50b, 50c, 50d, 50e, 50f, and 50g, firewall wireless access points 51a, 51b, and 52c. LANs 30a and 30b are implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management, server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. The LANs 30a and 30b may be LANs, LAN segments implemented, by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

Figure 1B:
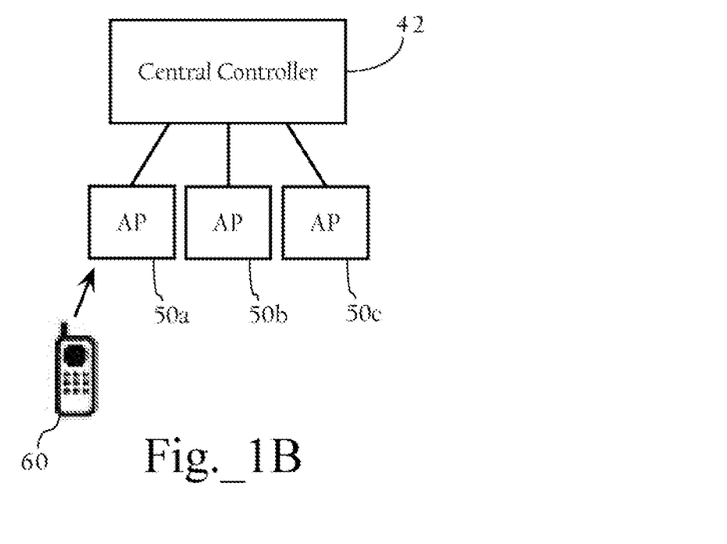
FIG. 1B illustrates an example hierarchical wireless network including a central controller.

FIG. 1B illustrates an example hierarchical wireless network including a central controller 42, which may used to implementation central controller 42a and/or central controller 42b of FIG. 1A. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 43 may be operably connected to one or more access points over a switched and/or routed network environment, as FIG. 1A illustrates. In particular implementations, central controller 42 is operative to monitor the status of authentication sessions between wireless clients and an authentication server and apply one or more network access policies based on the status.

Figure 1C:
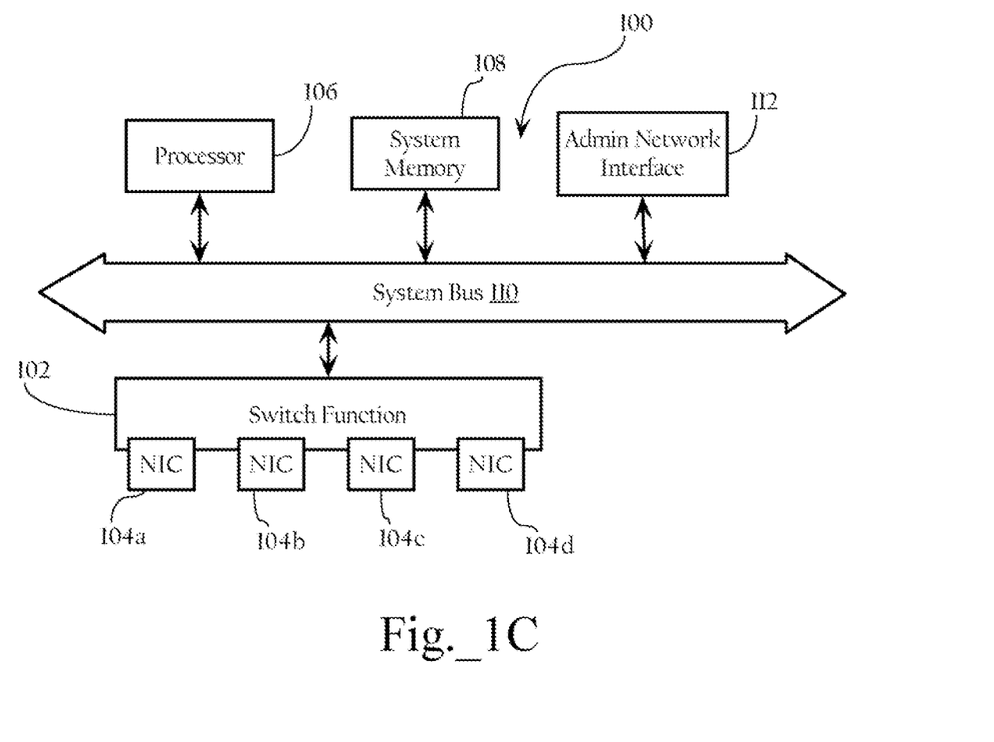
FIG. 1C illustrates an example hardware system, which may be used to implement a central controller.

FIG. 1C illustrates an example hardware system 100 which may be used to implement a central controller 42. As FIG. 1C shows, in one implementation, the central, control elements each comprise a switch function or fabric 102 comprising a network interface 104a (e.g., an Ethernet adapter) for connection to network 52 and network interfaces 104b, 104c, and 104d for connection to wireless access points. This switch function or fabric is implemented to facilitate connection to the access elements. Central controller 42, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 42 includes a single network interface.

B.3. WLAN Management Server

Figure 2:
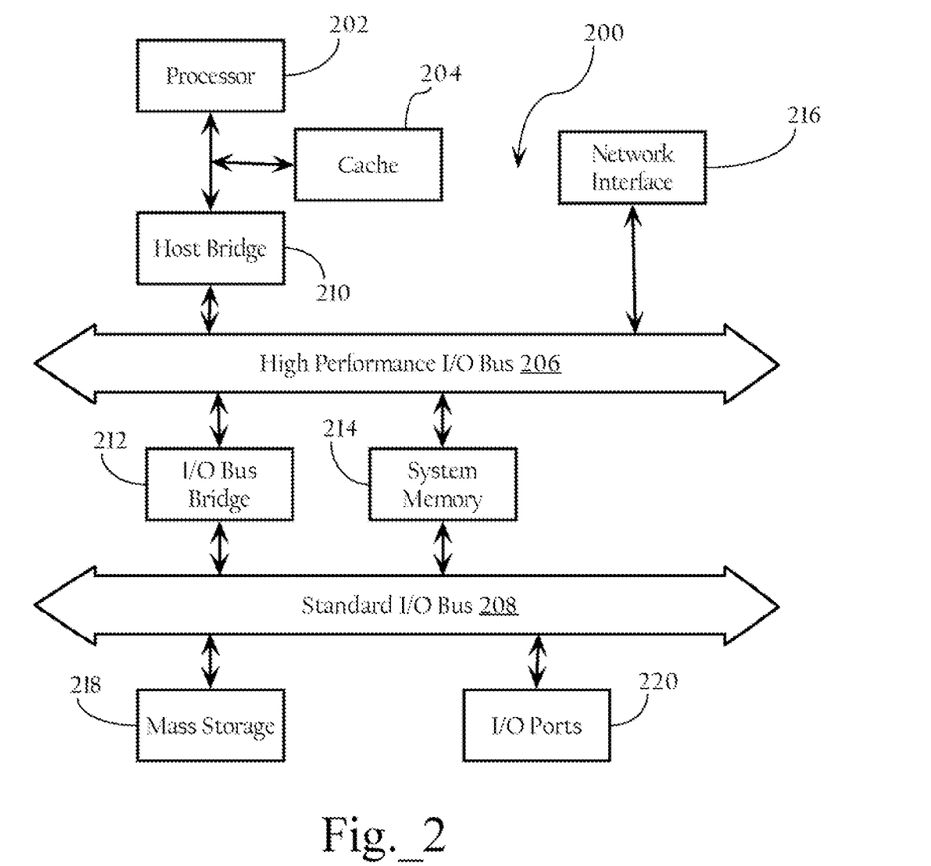
FIG. 2 illustrates an example hardware system, which may be used to implement a WLAN management server.

FIG. 2 illustrates an example hardware system 200, which may be used to implement a WLAN management server 20. In a particular implementation, WLAN management server 20 includes functionality allowing network administrators to configure one or more nodes of the wireless network. For example, a network administrator can configure a central controller 42a, 42b, or an access point to be a data wireless access point, or a firewall wireless access point. An RF firewall may coincide with a perimeter of a building, for example. In one implementation, the perimeter may be a predefined area that is defined, by a network administrator at a WLAN management server and then subsequently pushed to a location server for RF firewall coordination functionality. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 208, whereas I/O bus bridge 212 couples the two buses 206 and 208 to each other. A system memory 214 and a network/communication interface 216 couple to bus 206. Hardware system 200 may further include video memory (not shown) and a display device coupled to the video memory, Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming Instructions to perform the above described functions implemented in the system controller, whereas system memory 214 (e.g., DRAM) provides temporary storage for the data and programming instructions when executed by processor 202, I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed, above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present, invention may be used with other suitable operating systems, such as the Apple Macintosh Operating System, available from Apple Computer Inc. of Cupertino, Calif., UNIX operating systems, LINUX operating systems, and the like.

B.4. Wireless Access Point

Figure 3:
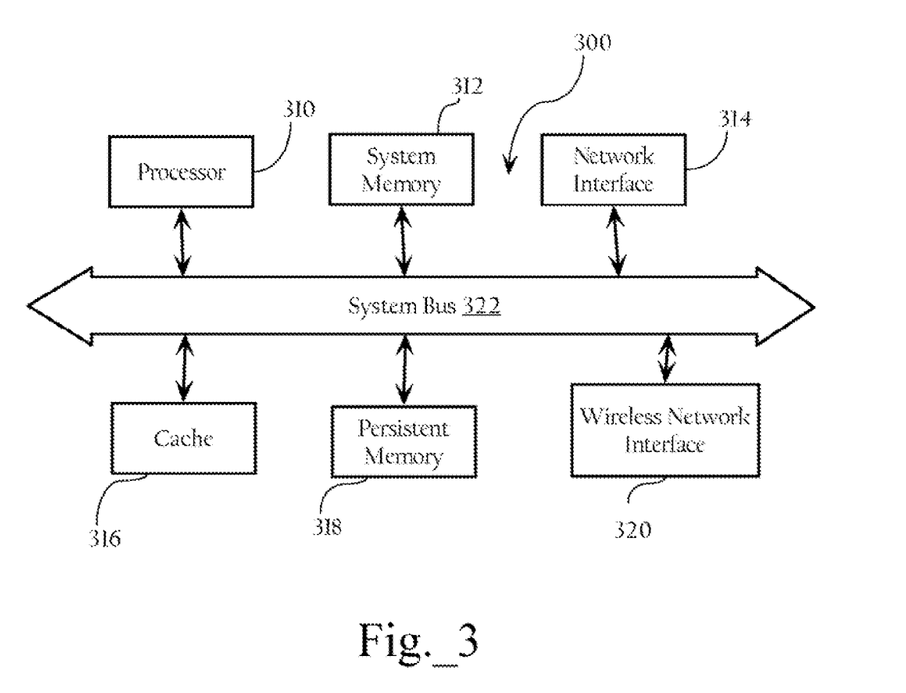
FIG. 3 illustrates an example hardware system, which may be used to implement a wireless access point.

FIG. 3 illustrates an example hardware system 300, which may he used to implement a data wireless access point 50 and/or firewall wireless access point (e.g., 51a, 51b). In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with, one or more wireless clients 60, and a system bus 322 interconnecting these components. The wireless access points 50 may also include software modules (including Dynamic Host Configuration Protocol (DHCP) clients, transparent bridging. Lightweight Access Point Protocol (LWAPP), Cisco® Discovery Protocol (CDP) modules, wireless access point modules. Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

In one implementation, a given wireless access point may be configured to function as data wireless access point or as a firewall wireless access point. Furthermore, a given wireless access point may be lightweight wireless access points or autonomous wireless access point that may be configured to implement the RF firewall coordination functionality described below.

C. Basic Wireless Network Environment for RF Firewall Coordination

Figure 4:
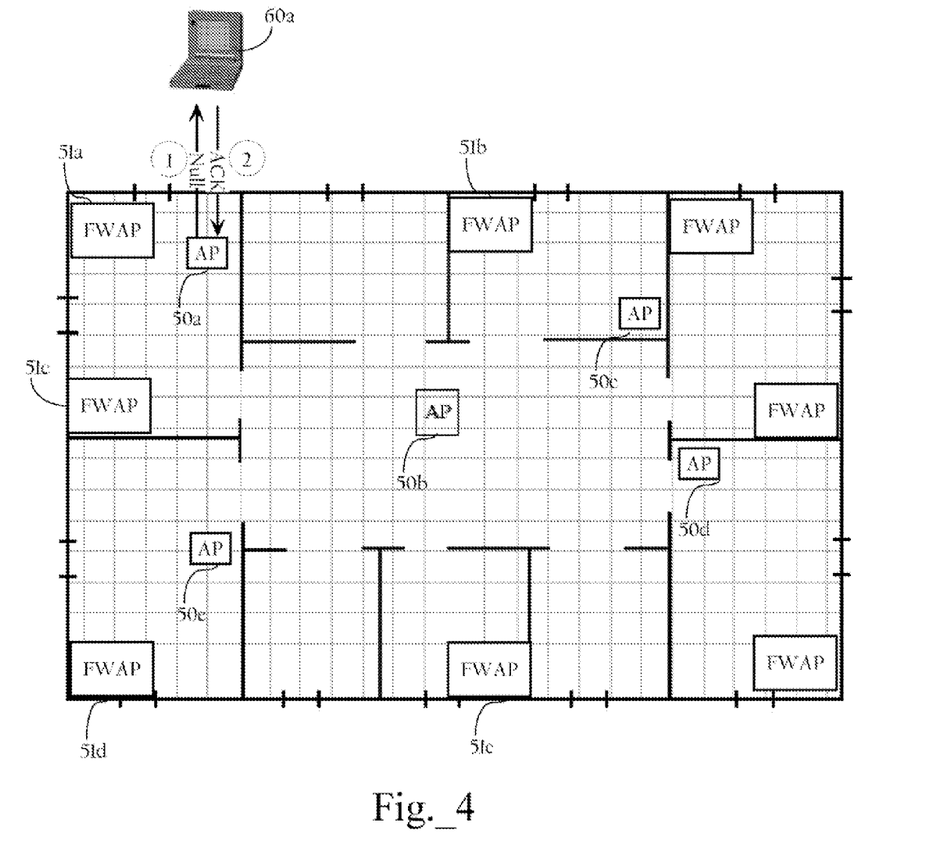
FIG. 4 illustrates an example network environment implementing a WLAN according to one implementation of the present invention.

FIG. 4 illustrates a physical space including a floor plan of a building. As FIG. 4 shows, in one implementation, data wireless access points 50a, 50b, 50c, 50d, 50e, etc. are distributed within the building. Also, firewall wireless access points 51a, 51b, 51c, 51d, 51e, etc. are evenly distributed along the periphery of the building inside the building and may also be distributed within the perimeter of the building to improve accuracy across multi-floor environments. In one implementation, data wireless access points 50 and firewall wireless access points 51 may also be distributed on the exterior of the building. The placement of the wireless access points is not constrained by the invention.

In one implementation, RF firewall wireless access points 51 may use directional antennas for each radio band supported, where one antenna points outside the budding and one antenna points inside the budding. Using directional antennas expedites the RF firewall coordination process, in that the location server 22 may make an inside/outside determination, described below, with fewer packets coming from the wireless client compared to using omni-directional antennas.

As indicated above in connection to FIG. 1A, the RF firewall wireless access points 51 need not be connected to the same central controller. Similarly, the data wireless access points 50 need not be connected to the same central controller. In other words, both RF firewall and data wireless access points may be distributed across multiple central controllers. However, in some implementations, RF firewall wireless access points 51 may also be connected to the same central controller, and data wireless access points 50 may also be connected to the same central controller.

C.1. RF Firewall Coordination Functionality

Figure 5:
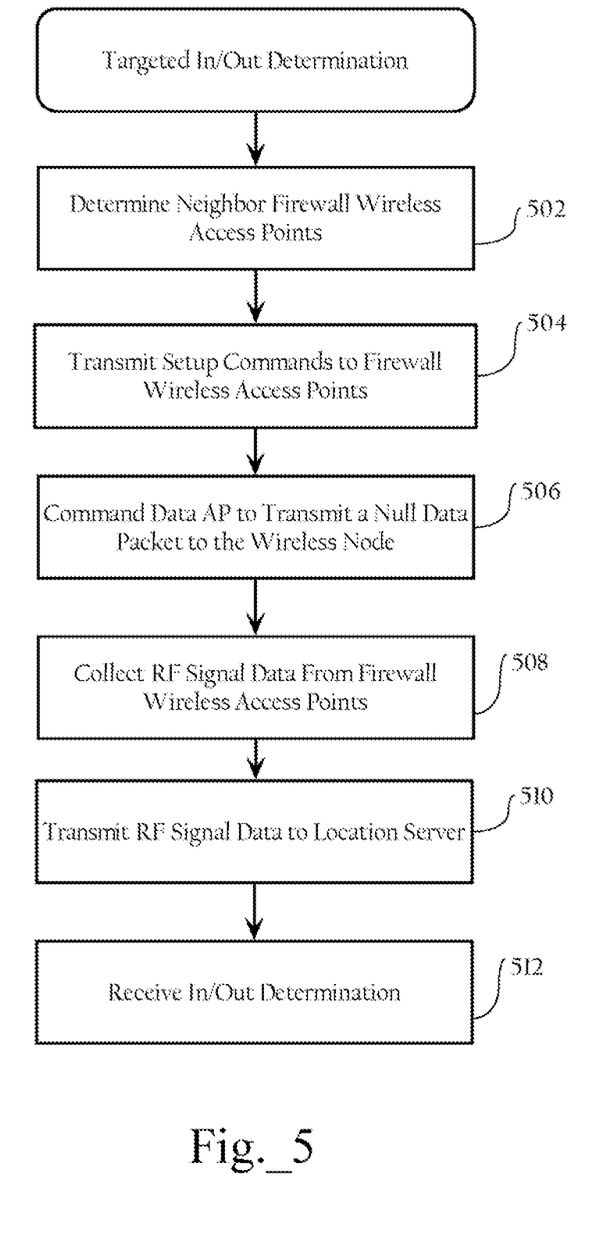
FIG. 5 illustrates an example method associated with radio frequency (RF) firewall functionality.

FIG. 5 illustrates an example method associated with RF firewall coordination functionality. While the implementations below described herein show the RF firewall coordination functionality being implemented in the central controller, the RF firewall coordination functionality may also be implemented at other wireless network nodes. For example, in one implementation, the RF firewall coordination functionality may be located in a WLAN management server 20 (e.g., a WDS server), distributed among one or more wireless access points. In one implementation, the RF firewall coordination functionality may also be implemented using hardware, software, or a combination thereof.

The execution of the RF firewall coordination functionality process may be triggered by different events. For example, an attempt by a wireless client to communicate with the wireless network (e.g., as indicated by an authentication request, an association request, or a probe request) may trigger the RF firewall coordination processes described herein. In one implementation, a trigger even may also include the detection of unauthorized behavior by the wireless client or detected movement of the wireless client to a location outside the perimeter. In one implementation, any appropriate network node such as the AAA server 21 or the data wireless access points 50 may be configured to alert a remote node after a wireless client attempts access. In other implementations, a central controller (e.g., 42a) already monitors wireless management traffic and is, therefore, able to detect new accesses without explicit signaling messages from the access points. In one implementation, the RF firewall coordination functionality may operate concurrently with Layer 2 or Layer 3 processes, such as authentication of the wireless client. The RF firewall coordination functionality may be triggered when the location server 22 detects that a wireless client may have exited the building, or is within a threshold distance of the perimeter of a building. Also, an Intrusion Detection System (IDS) alert may trigger the RF firewall coordination functionality process. In one implementation, any alert or event, coming from a central controller, network management server, access point, or location server may trigger the RF firewall coordination functionality.

In the implementation illustrated in FIG. 5, a central controller (e.g., central controller 42a), when triggered, determines neighbor fire wail wireless access points (502). Neighbor firewall wireless access points, in particular implementations, are firewall wireless access points that neighbor the data wireless access points to which the wireless client is associated or is attempting to associate. In one implementation, the central controller 42a may derive a list of firewall wireless access points in various ways. For example, central controller 42a may derive the list dynamically by choosing the firewall wireless access points that can detect neighbor discovery or beacon packets sent by the data wireless access point (e.g., data wireless access point 50a). Alternatively, any wireless network device which has knowledge of the building configuration (e.g., the wireless management server 20) may transmit/push the list of neighbors to the central controller 42a. In the implementation illustrated in FIG. 4, a list of neighbor wireless access points, relative to data wireless access point 50a, may include, for example, firewall wireless access points 51a, 51b, and 51c. In one implementation, neighbor firewall wireless access points may include both firewall wireless access points and data wireless access points. In one implementation, the firewall wireless access points may be any infrastructure radio transceiver or transducer, or data wireless access points functioning as firewall wireless access points. In one implementation, the neighbor list may be based on the physical location of the firewall wireless access points, RF connectivity of the firewall wireless access points, a default neighbor list, and the like.

Central controller 42a then transmits set up commands to the neighbor firewall wireless access points 51a, 51b, and 51c (504). In one implementation, the set up commands may include the media access control (MAC) address of the wireless client, and one or more RF parameters, such as a radio time slot, or the RF channel identifier (e.g., channel 3) to which the wireless firewall access points should tune their respective radios, in one implementation, the firewall wireless access points may respond to central controller 42a with acknowledgement messages or denial messages. In one implementation, the central controller 42a instructs the firewall wireless access points 51 to switch to the same RF channel (e.g., channel 3) as the wireless client.

Central controller 42a then commands the data wireless access point 50a to transmit one or more wireless frames to the wireless node 60a (506), operative to cause the wireless node to transmit a response, such as a link or higher layer acknowledgment. In one implementation, the wireless frames may be null data packets. In one implementation, null data packets may correspond to IEEE 802.11 specification. Accordingly, the wireless client responds to the packets with acknowledgement (ACK) frames. The firewall wireless access points (and optionally data wireless access point 50a) detect the RF frames corresponding to these acknowledgments, collect RF signal data associated with the acknowledgment packets, and transmit the collected RF signal data to the central controller 42a. Central controller 42a may collect RF signal data from the firewall wireless access points 51a, 51b, and 51c (508) and optionally from the data wireless access point 50a.

Central controller 42a, in one implementation, transmits the RF signal data to the location server 22 (510) in a request. In one implementation, location server 22 computes the location of the wireless client based on those RF signal data and indicates to the RF firewall coordination functionality whether the wireless client is inside or outside a predefined perimeter (e.g., building or RF secured location), or within some restricted zone.

As described in more detail below in connection with FIG. 8, location server 22 determines whether the wireless client is inside or outside the defined perimeter (e.g., the building) based on the collected RF signal data. Central controller 12a receives an in/out determination from location server 22 (512), and may apply one or more access policies based on the received determination.

C.2. Policies for Wireless Network Access

In one embodiment, based on the in/out determination from location server 22, the central controller 42a may apply various policies such as a strict policy, a loose policy, and a notification policy for client traffic during the time period where a given wireless client may have already passed an authentication process but where an RF firewall process is still pending. While the location server 22 has been described as performing the in/out determination, in other embodiments, any appropriate network node (e.g., a WLAN management server or a central controller) may also perform the in/out determination.

In one implementation, pursuant to a strict policy, the central controller 42a may permit the wireless client to remain connected to the wireless network for authentication purposes and RF firewall coordination functionality purposes, but does not permit the wireless client to transmit or receive data packets until both the authentication process completes and the RF firewall coordination functionality process completes and the wireless client passes both processes. In one implementation, the RF firewall coordination functionality may permit some specific types of packets such as Address Resolution Protocol (ARP), Dynamic Host Configuration Protocol (DHCP) clients, or Domain Name System (DNS) packets.

In one implementation, pursuant to a loose policy, the central controller 42a may permit the wireless client to transmit and receive data packets after the wireless client may have already passed an authentication process but the final determination as to whether the wireless client may continue transmitting and receiving data packets is made after the RF firewall coordination functionality process completes.

In one embodiment, once the RF firewall coordination functionality and authentication process completes, the central controller 42a may make one of the following final decisions. In one implementation, an authentication failure will automatically result in disallowing the wireless client to be connected to the wireless network, regardless of the inside/outside determination. In one implementation, if the wireless client is inside the predefined area and passed the authentication process required by the wireless network (e.g., 802.1x or WiFi Protected Access (WPA)-pre-shared key (PSK)), the wireless client may be allowed onto the network.

In one implementation, if the wireless client passes the authentication process but is deemed to be outside of the RF secured area, access privilege of the wireless client may depend on the policy set up by a system administrator. For example, the wireless client may have limited access to the network or may be denied access to the network.

In one implementation, for a notification policy, the RF firewall coordination functionality process may record the results of the RF firewall coordination functionality and authentication process but may not enforce any policies, and may allow a given wireless client to access the wireless network. In one implementation, a notification may be stored in a central controller 42 or any other appropriate location.

In one implementation, in addition to the trigger events described above, the RF firewall coordination functionality may perform the operations described, herein for various reasons. For example, trigger events may be when a given data or firewall wireless access point detects that a given wireless client moves to a location within a predefined distance from the predefined perimeter (e.g., 1 foot, 5 feet, etc.), leaves the predefined perimeter, etc.

C.3. Coordination of Multiple Central Controllers

As indicated above, the firewall wireless access points that perform functions for the RF firewall coordination functionality need not be connected to the same controller. Accordingly, a given remote central controller may function as a proxy for a master central controller (or other master wireless network, node handling the RF firewall coordination functionality), as describe in more detail below in connection with FIG. 8.

Figure 6:
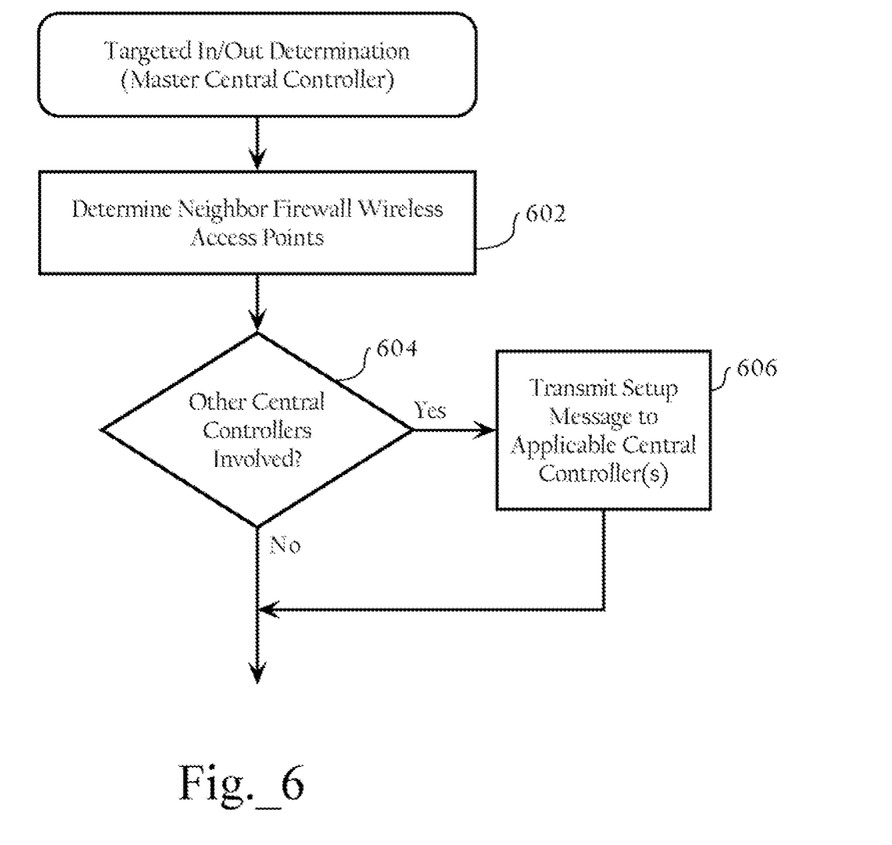
FIG. 6 illustrates another example method associated with RF firewall functionality.
Figure 7:
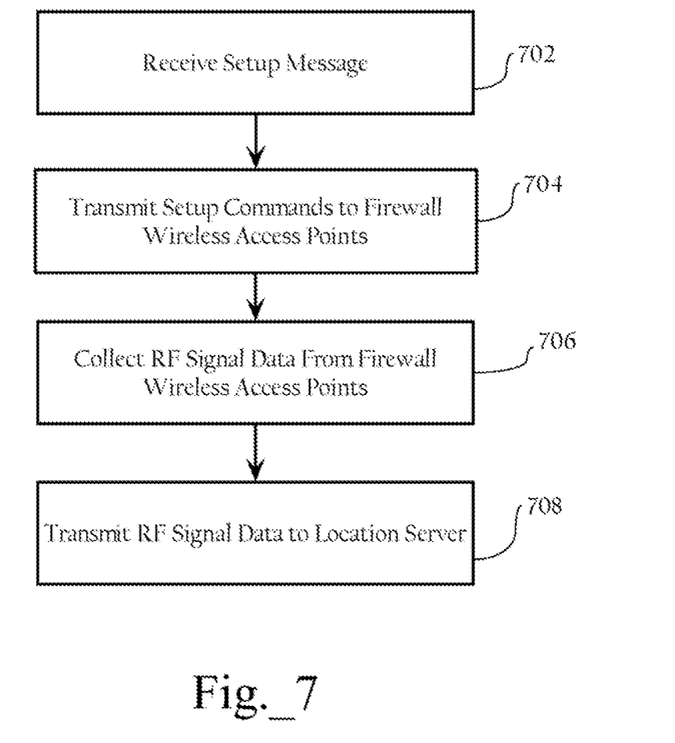
FIG. 7 illustrates another example method associated with RF firewall functionality.

FIG. 6 illustrates another example method associated with RF firewall functionality. As FIG. 6 shows, central controller 42b determines the neighbor firewall wireless access points (e.g., 51a, 51b, 51c, etc.) (602). Central controller 42b then determines if other central controllers (e.g., central controller 42a) are involved (604). That is, whether one or more of the neighbor firewall access points are managed by another central controller. If so, central controller 42b transmits set up commands to the applicable central controller 42a (606). In one implementation, the set up commands may include the media access control (MAC) address of the wireless client, the radio slot and the RF channel number (e.g., channel 3) to which the wireless access points time. The remote central controller 42a operates similar to its operation described above in connection to FIG. 5, FIG. 7 illustrates another example method associated with RF firewall functionality. As FIG. 7 shows, central controller 42a first receives a set up message from the master central controller 42b (702). Central controller 42a then transmits set up commands to the firewall wireless access points 51a, 51b, and 51c (704). Central controller 42b then commands the data wireless access point 50a to transmit a data packet (e.g., a null data packet) to the wireless node 60a (706). Central controller 42a then collects RF signal data from the firewall wireless access points 51a, 51b, and 51c (708). Central controller 42b may also collect RF signal information from neighbor firewall access points that it manages or from one or more data wireless access points (e.g., data wireless access point 50a, etc.). Central controller 42a then transmits the RF signal data, to the master central controller 42b (710).

Figure 8:
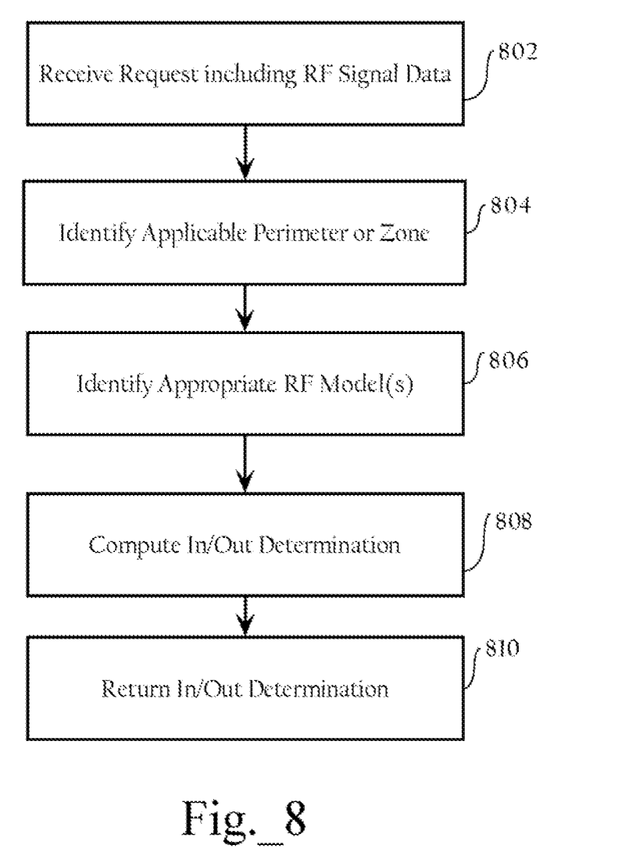
FIG. 8 illustrates another example method associated with RF firewall functionality.

FIG. 8 illustrates another example method associated with RF firewall functionality. As FIG. 8 shows, location server 22 receives a location request including RF signal data from a central controller 42a (802). Location server 22 then identifies the appropriate perimeter or zones corresponding to the data wireless access point 50a identified in the location request (804). Location server 22 then identifies appropriate RF models, such as RV coverage maps corresponding to the firewall wireless access points, to compute the estimated location of the wireless client (806).

Location server 22 then computes an in/out determination (808), in one implementation, by computing the estimated location of the wireless client using the received RF signal data and the identified zones or perimeters. Location server 22 then returns the in/out determination to the requesting central controller 42a (808).

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A non-transitory computer-readable storage medium encoded with computer-executable instructions, the computer-executable instructions, when executed, operable to cause one or more processors to: identify, responsive to a triggering event, one or more radio frequency (RF) firewall transceivers that neighbor a data wireless access point to which a given wireless client is communicating; configure one or more of the identified neighboring RF firewall transceivers to detect RF frames transmitted by the wireless client; cause the data wireless access point to transmit one or more wireless messages operative to cause the wireless client to transmit RF frames; collect RF signal data corresponding to the RF frames transduced by one or more of the identified neighboring RF firewall transceivers; transmit the collected RF signal data to a location system; receive from the location system an indication of the location of the wireless client; and apply one or more network access policies based on the indication of the location.

2. The non-transitory computer-readable storage medium of claim 1 wherein the computer-executable instructions are further operable to cause the one or more processors to collect RF signal data corresponding to the RF frames transduced by one or more of the data wireless access points.

3. The non-transitory computer-readable storage medium of claim 1 wherein the indication characterizing the location of the wireless client indicates whether the wireless client is inside or outside a defined perimeter.

4. The non-transitory computer-readable storage medium of claim 1 wherein the one or more messages operative to cause the wireless client to transmit RF frames are null data packets.

5. The non-transitory computer-readable storage medium of claim 1 wherein the RF frames transmitted by the wireless client correspond to Wireless Local Area Network (WLAN) technology.

6. The non-transitory computer-readable storage medium of claim 1 wherein the trigger event is a detected connection event to the data wireless access point.

7. The non-transitory computer-readable storage medium of claim 1 wherein the trigger event is an Wireless Local Area Network (WLAN) association.

8. The non-transitory computer-readable storage medium of claim 1 wherein the trigger event is a roam event.

9. The non-transitory computer-readable storage medium of claim 1 wherein the trigger event comprises detection of unauthorized behavior by the wireless client.

10. The non-transitory computer-readable storage medium of claim 1 wherein the trigger event is a detected movement of the wireless client to a location within a predefined distance from a predefined perimeter.

11. The non-transitory computer-readable storage medium of claim 1 wherein the trigger event is a detected movement of the wireless client to a location outside a predefined perimeter.

12. The non-transitory computer-readable storage medium of claim 10 wherein the network access policy permits the wireless client to transmit or receive data packets after passes both an authentication process and an RF firewall coordination functionality process complete and the wireless client passes both processes.

13. The non-transitory computer-readable storage medium of claim 10 wherein the network access policy permits the wireless client to transmit and receive data packets after the wireless client may have already passed an authentication process but a final determination as to whether the wireless client may continue transmitting and receiving data packets is made after the RF firewall coordination functionality process completes.

14. A method comprising;
identifying, responsive to a triggering event, one or more radio frequency (RF) firewall transceivers that neighbor a data wireless access point to which a given wireless client is communicating;
configuring one or more of the identified neighboring RF firewall transceivers to detect RF frames transmitted by the wireless client;
causing the data wireless access point to transmit one or more wireless messages operative to cause the wireless client to transmit RF frames;
collecting RF signal, data corresponding to the RF frames transduced by one or more of the identified neighboring RF firewall transceivers;
transmitting the collected RF signal data to a location system;
receiving from the location system an indication of the location of the wireless client; and
applying one or more network access policies based on the indication of the location.

15. The method of claim 14 further comprising collecting RF signal data corresponding to the RF frames transduced by one or more of the data wireless access points.

16. The method of claim 14 wherein the indication characterizing the location of the wireless client indicates whether the wireless client is inside or outside a defined perimeter.

17. The method of claim 14 wherein the one or more messages operative to cause the wireless client to transmit RF frames are null data packets.

18. The method of claim 14 wherein the RF frames transmitted by the wireless client correspond to Wireless Local Area Network (WLAN) technology.

19. The method of claim 14 wherein the trigger event is a detected connection event to the data wireless access point.

20. The method of claim 14 wherein the trigger event is an Wireless Local Area Network (WLAN) association.

21. The method of claim 14 wherein the trigger event is a roam event.

22. The method of claim 14 wherein the trigger event comprises detection of unauthorized behavior by the wireless client.

23. The method of claim 14 wherein the trigger event is a detected movement of the wireless client to a location within a predefined distance from a predefined perimeter.

24. The method of claim 14 wherein the trigger event is a detected movement of the wireless client to a location outside the perimeter.

25. The method of claim 23 wherein the network access policy permits the wireless client to transmit or receive data packets after passes both an authentication process and an RF firewall coordination functionality process complete and the wireless client passes both processes.

26. The method of claim 23 wherein the network access policy permits the wireless client to transmit and receive data packets after the wireless client may have already passed an authentication process but a final determination as to whether the wireless client may continue transmitting and receiving data packets is made after the RF firewall coordination functionality process completes.

27. A system comprising:
one or more data wireless access points;
one or more firewall wireless access points; and
a wireless network infrastructure node operable to manage radio frequency (RF) firewall coordination functionality that identify, responsive to a triggering event, one or more radio frequency (RF) firewall transceivers that, neighbor a data wireless access point to which a given wireless client is communicating; configure one or more of the identified neighboring RF firewall transceivers to detect RF frames transmitted by the wireless client; cause the data wireless access point to transmit one or more wireless messages operative to cause the wireless client, to transmit RF frames; collect RF signal data corresponding to the RF frames transduced by one or more of the identified neighboring RF firewall transceivers; transmit the collected RF signal data to a location system; receive from the location system an indication of the location of the wireless client; and apply one or more network access policies based on the indication of the location.

* * * * *